United States Patent
Kim et al.

(10) Patent No.: US 7,180,562 B2
(45) Date of Patent: Feb. 20, 2007

(54) LIQUID CRYSTAL DISPLAY AND FABRICATING METHOD COMPRISING A HYDROPHILIC BUFFER LAYER HAVING A THICKNESS OF 10Å TO 50Å

(75) Inventors: Sang In Kim, Seoul (KR); Il Ryong Park, Kumi-shi (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 09/730,836

(22) Filed: Dec. 7, 2000

(65) Prior Publication Data
US 2001/0004280 A1   Jun. 21, 2001

(30) Foreign Application Priority Data
Dec. 17, 1999 (KR) .............................. 1999-58748

(51) Int. Cl.
*G02F 1/13* (2006.01)
(52) U.S. Cl. ........................ 349/138; 349/187
(58) Field of Classification Search ............... 349/138, 349/187, 43, 93, 92
See application file for complete search history.

(56) References Cited
U.S. PATENT DOCUMENTS
6,038,008 A * 3/2000 Kim et al. .................. 349/138
6,060,130 A * 5/2000 Kim et al. .................. 427/558
6,204,907 B1 * 3/2001 Hiraishi et al. ............. 349/155

FOREIGN PATENT DOCUMENTS

| KR | 1998-017626 | 6/1998 |
|---|---|---|
| KR | 98-40306 | 8/1998 |
| KR | 1999-014338 | 2/1999 |
| KR | 99-38011 | 6/1999 |

* cited by examiner

*Primary Examiner*—Dung T. Nguyen
*Assistant Examiner*—Thoi V. Duong
(74) *Attorney, Agent, or Firm*—McKenna Long & Aldridge LLP

(57) ABSTRACT

A liquid crystal display and a method of fabricating such a liquid crystal display wherein a buffer layer having a hydrophilic property is formed at normal (atmospheric) pressure on the exposed surface of a hydrophobic organic passivation layer. The buffer layer improves the adhesion between an exposed surface and a subsequently formed electrode layer. The buffer layer is beneficially formed from an oxide layer that is induced on the surface of the buffer layer using UV radiation having a wavelength of 100 to 200 nm. Such a buffer layer can eliminate vacuum fabrication and shorten the fabrication time of the liquid crystal display.

18 Claims, 4 Drawing Sheets

LIQUID CRYSTAL DISPLAY AND FABRICATING METHOD COMPRISING A HYDROPHILIC BUFFER LAYER HAVING A THICKNESS OF 10Å TO 50Å

This application claims the benefit of Korean Patent Application No. 1999-58748, filed on Dec. 17, 1999, which is hereby incorporated by reference for all purposes as if fully set forth herein.

BACKGROUND OF THE INVENTION

1. Field of the Invention

The present invention relates to liquid crystal displays. More particularly, it relates to a liquid crystal display, and to a method of fabricating that display, having improved adhesion between a passivation layer and a pixel electrode.

2. Discussion of the Related Art

Generally, a liquid crystal display (LCD) includes switching devices consisting of thin film transistors, each having a gate electrode, a gate insulating film, an active layer, an ohmic contact layer, and source and drain electrodes. A liquid crystal display further includes a liquid crystal material between a lower plate, provided with pixel electrodes and the switching devices, and an upper plate provided with color filters.

An LCD is comprised of N×M pixels, where N and M are integers. Each pixel includes a thin film transistor and a pixel electrode that is coupled to the thin film transistor. N gate lines and M data lines transmit signals to the gate electrodes and to the drain electrodes of the thin film transistors. The gate lines and data lines are formed in such a manner that they cross. The pixel electrodes beneficially overlap the data lines and the gate so as to increase an aperture ratio of the LCD. At the overlap of each pixel electrode and data line is a passivation layer. That passivation layer is usually formed from an organic insulator having a small dielectric constant. This reduces a parasitic capacitance between the pixel electrodes and the data lines. Organic materials such as BCB (β-staggered-divinyl-siloxane-benzocyclobutene), acrylic organic compound, or PFCB (perfluorocyclobutane) are common organic insulators.

FIGS. 1A to 1E illustrate a simplified process of fabricating a conventional LCD. Referring now to FIG. 1A, a metal thin film, usually of aluminum (Al) or copper (Cu), is formed on a transparent substrate 11, beneficially by sputtering. The metal thin film is then patterned to form a gate electrode 13. Beneficially, the fabrication of the gate electrode is performed by wet photolithography.

Referring now to FIG. 1B, a gate insulating film 15, an active layer 17, and an ohmic contact layer 19 are sequentially formed over the gate electrode 13, beneficially by chemical vapor deposition (CVD). The gate insulating film 15 is beneficially formed from an insulation material, such as silicon oxide or silicon nitride. The active layer 17 is beneficially formed from undoped amorphous silicon or undoped polycrystalline silicon. The ohmic contact layer 19 is beneficially made from an amorphous silicon or a polycrystalline silicon that is doped with an n-type or p-type impurity at a high concentration. The ohmic contact layer 19 and the active layer 17 are then photolithographically patterned using anisotropic etching to expose the gate insulating film 15. However, as shown, the active layer 17 and the ohmic contact layer 19 are left over the gate electrode 13 and over its surrounding area.

Referring now to FIG. 1C, a metal layer is then deposited over the resulting structure, beneficially using either CVD or sputtering. In particular, the metal layer is formed over the ohmic contact layer 19 so as to make electrical contact with the ohmic contact layer 19. Beneficially, the metal layer is comprised of molybdenum (Mo), chrome (Cr), titanium (Ti) or tantalum (Ta), or of a molybdenum alloy such as MoW, MoTa or MoNb. The metal layer is then patterned by photolithography to expose the gate insulating film 15. Additionally, part of the metal layer over the gate electrode 13 and part of the ohmic contact layer 19 is removed, thereby forming a source electrode 23 and a drain electrode 21. Additionally, part of the active layer 17 is exposed. The exposed portion of the active layer 17 becomes a channel.

Referring now to FIG. 1D, an organic insulation material having a small dielectric constant, beneficially an acrylic organic compound, BCB or PFCB, or the like, is deposited on the transparent substrate 11, thereby forming a passivation layer 25. In the conventional LCD, the passivation layer 25 has a hydrophobic property. Then, the passivation layer 25 is patterned to define a contact hole 27 that exposes the drain electrode 21. The passivation layer 25 is then dry ashed in a vacuum to transform its surface to have a hydrophilic property.

Referring now to FIG. 1E, an indium tin oxide (ITO), tin oxide (TO) or indium zinc oxide (IZO) transparent conductive material is deposited on the passivation layer 25 and into the contact hole 27 such that the transparent conductive material electrically contacts the drain electrode 21. As the surface of the passivation layer 25 has a hydrophilic property, the adhesion between the passivation layer 25 and the transparent conductive material is better than it would be if the surface of the passivation layer was left with a hydrophobic property. Then, the transparent conductive material is patterned by photolithography, beneficially using an acid mixture such as $HCl,(COOH)_2$ or $HCl+HNO_3$ as an echant, to form a pixel electrode 29.

In the conventional method of fabricating the LCD as described above, first a passivation layer having a hydrophobic property is dry ashed in a vacuum to produce a surface having a hydrophilic property, and then a transparent conductive material is deposited. The transparent conductive material is then patterned. This procedure tends to prevent the pixel electrode from being reduced in size by etching when it is being formed.

While generally successful, the conventional method of fabricating the LCD has a problem. Since the passivation layer must be dry ashed in a vacuum, the fabrication time tends to be rather long because it takes a relatively long time to form a vacuum. Therefore, a way of providing a surface having a hydrophilic property at normal process pressure, usually atmospheric pressure, would be beneficial.

SUMMARY OF THE INVENTION

Accordingly, the present invention is directed to a method of fabricating a liquid crystal display that substantially obviates one or more of the problems due to limitations and disadvantages of the related art.

An object of the present invention is to provide a method of fabricating a liquid crystal display wherein a buffer layer having a hydrophilic property is provided at the surface of a passivation layer having a hydrophobic property, beneficially when the passivation layer is experiencing normal pressure.

Another object of the present invention is to provide a method of fabricating a liquid crystal display wherein a buffer layer having a hydrophilic property is provided at the surface of a passivation layer using ultraviolet rays. Beneficially the ultraviolet rays have wavelengths of 100 to 200 nm.

Another object of the present invention is to provide a liquid crystal display that includes a buffer layer having a hydrophilic property disposed between a pixel electrode and a passivation layer.

Additional features and advantages of the invention will be set forth in the description that follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a method of fabricating a liquid crystal display includes the steps of forming an organic passivation layer over a thin film transistor on a transparent substrate; patterning the passivation layer to define a contact hole that exposes a drain electrode, and irradiating the surface of the passivation layer using ultraviolet rays so as to produce a buffer layer having a hydrophilic property; and then forming a pixel electrode on the buffer layer such that the pixel electrode electrically contacts the drain electrode through the contact hole.

It is to be understood that both the foregoing general description and the following detailed description are exemplary and explanatory and are intended to provide further explanation of the invention as claimed.

BRIEF DESCRIPTION OF THE DRAWING

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE EMBODIMENT

Reference will now be made in detail to an embodiment of the present invention, an example of which is illustrated in the accompanying drawings.

Figure 1A:
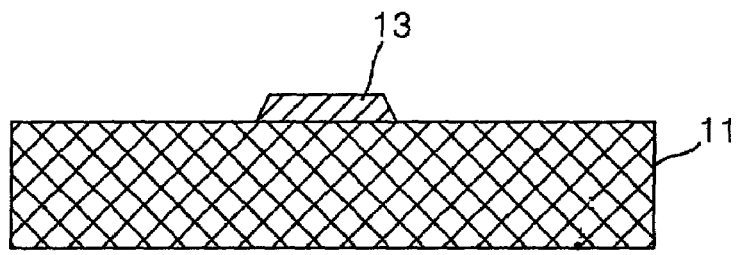
FIGS. 1A to 1E are sectional views showing a conventional process of fabricating a liquid crystal display.
Figure 1B:
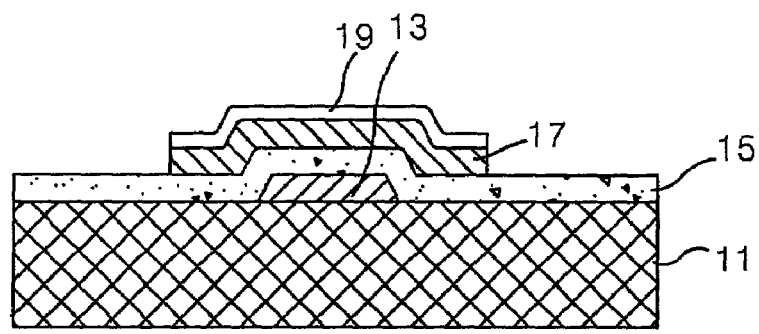
Figure 1C:
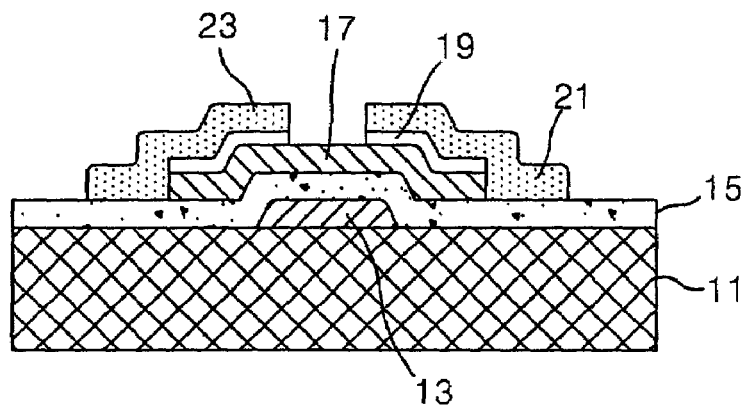
Figure 1D:
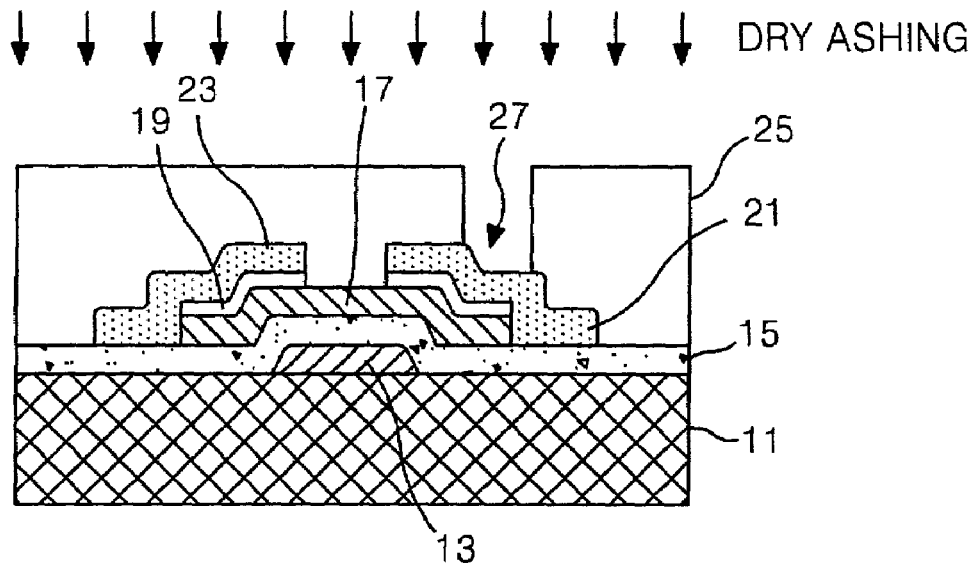
Figure 1E:
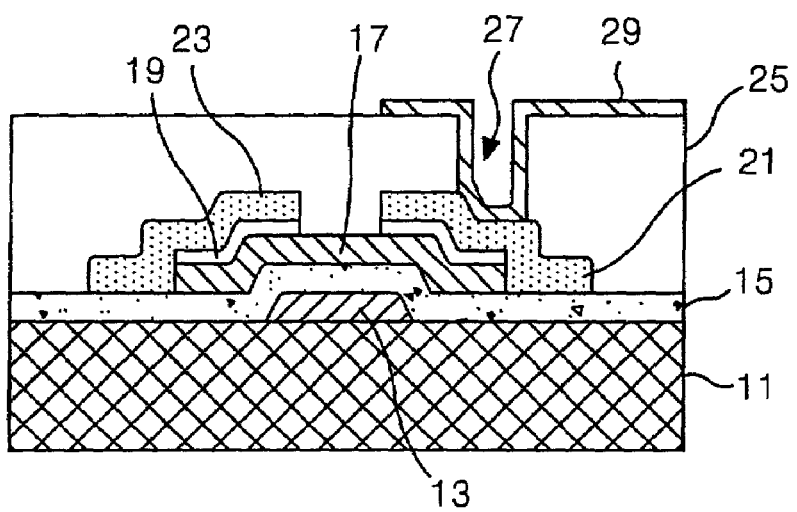
Figure 2A:
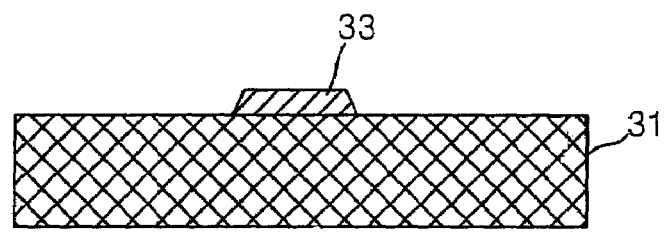
FIGS. 2A to 2E are sectional views showing a process of fabricating a liquid crystal display, as well as the display itself, according to an embodiment of the present invention.

Referring now to FIG. 2A, a metal thin film, usually of aluminum (Al) or copper (Cu), is formed on a transparent substrate 31, beneficially by sputtering or by coating using an electroless plating technique. The transparent substrate 31 is beneficially of glass, quartz, or a transparent plastic. The metal thin film is then patterned to form a gate electrode 33. Beneficially, the fabrication of the gate electrode is performed by wet photolithography.

Figure 2B:
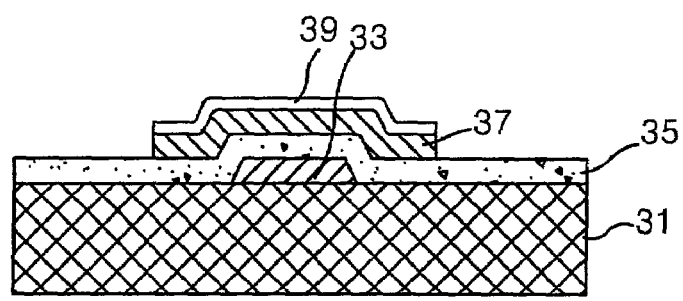

Referring now to FIG. 2B, a gate insulating film 35, an active layer 37, and an ohmic contact layer 39 are sequentially formed over the gate electrode 33 and over the transparent substrate 31, beneficially by chemical vapor deposition (CVD). The gate insulating film 35 is beneficially formed from an insulation material, such as silicon oxide or silicon nitride. The active layer 37 is beneficially formed from undoped amorphous silicon or undoped polycrystalline silicon. The ohmic contact layer 39 is beneficially made from an amorphous silicon or a polycrystalline silicon that is doped with an n-type or p-type impurity at a high concentration. The ohmic contact layer 39 and the active layer 37 are then photolithographically patterned using anisotropic etching to expose the gate insulating film 35. However, the active layer 37 and the ohmic contact layer 39 are left over the gate electrode 33 and over its surrounding area as shown in FIG. 2B.

Figure 2C:
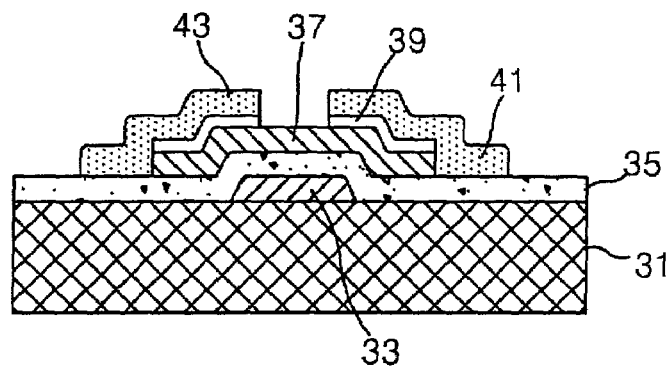

Referring now to FIG. 2C, a metal layer comprised of molybdenum (Mo), chrome (Cr), titanium (Ti) or tantalum (Ta), etc., or a molybdenum alloy such as MoW, MoTa or MoNb, etc. is deposited on the gate insulating film 35 and ohmic contact layer 39 by CVD or sputtering technique. The metal layer forms an ohmic contact with the ohmic contact layer 39. Then, the metal layer is patterned by the photolithography to expose the gate insulating film 35. Additionally, part of the metal layer over the gate electrode 33 and part of the ohmic contact layer 39 are etched to form a source electrode 41 and a drain electrode 43. Additionally, a portion of the active layer 37 over the gate electrode 33 is exposed as shown in FIG. 2C. The exposed portion becomes a channel.

Figure 2D:
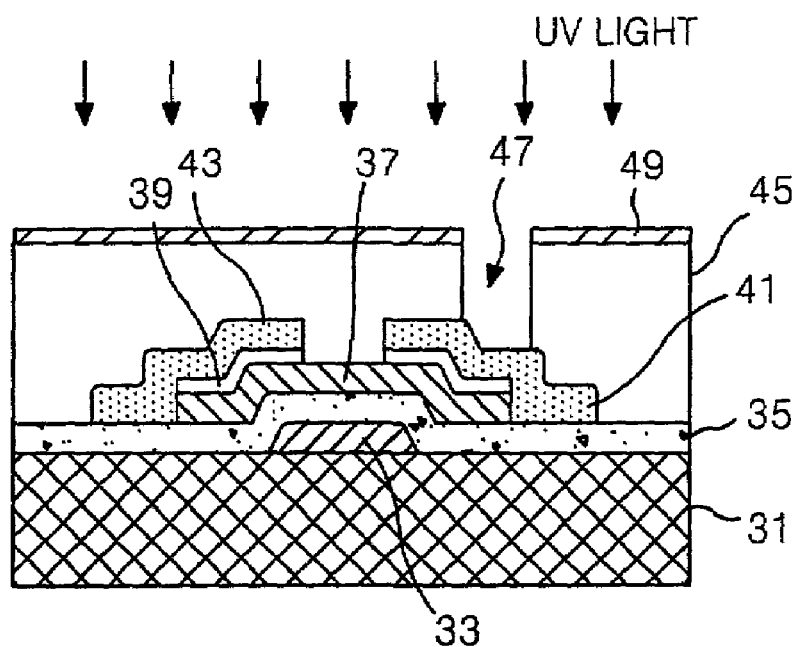

Referring now to FIG. 2D, a passivation layer 45 is then formed over the structure shown in FIG. 2C. The passivation layer 45 is comprised of an organic insulation material having a small dielectric constant, beneficially an acrylic organic compound, BCB or PFCB, or such. The passivation layer 45 is then patterned and etched to define a contact hole 47 that passes through the passivation layer so as to expose the drain electrode 41.

The surface of the passivation layer 45 is then irradiated using an ultraviolet (UV) ray having a wavelength of 100 to 200 nm. This irradiation is beneficially performed at a normal process (atmospheric) pressure. The irradiation forms a buffer layer 49 on the passivation layer having a thickness of about 10 to 50 Å. The buffer layer is comprised of $SiO_2$ or of another oxide. Prior to irradiating the passivation layer 45 its surface was hydrophobic, having a relatively large contact angle of about 50° to 60°. After irradiation, the external surface is that of the buffer layer 49. The surface of the buffer layer 49 has a relatively small contact angle, typically less than 10°, and thus has a hydrophilic property.

Since UV rays having a wavelength of about 100 to 200 nm have high energy, oxygen in the air is excited and some becomes ozonized. At this time, a UV ray passing through the ozonized oxygen forms a molecular combination with the surface of the organic insulating film such that a buffer layer 49 having a hydrophilic property is formed. As the buffer layer 49 can be formed on the surface of the passivation layer 45 at a normal (atmospheric) pressure, the overall process of fabricating the liquid crystal display is simplified and the production rate can be improved. This is at least partially because a vacuum is not required.

Figure 2E:
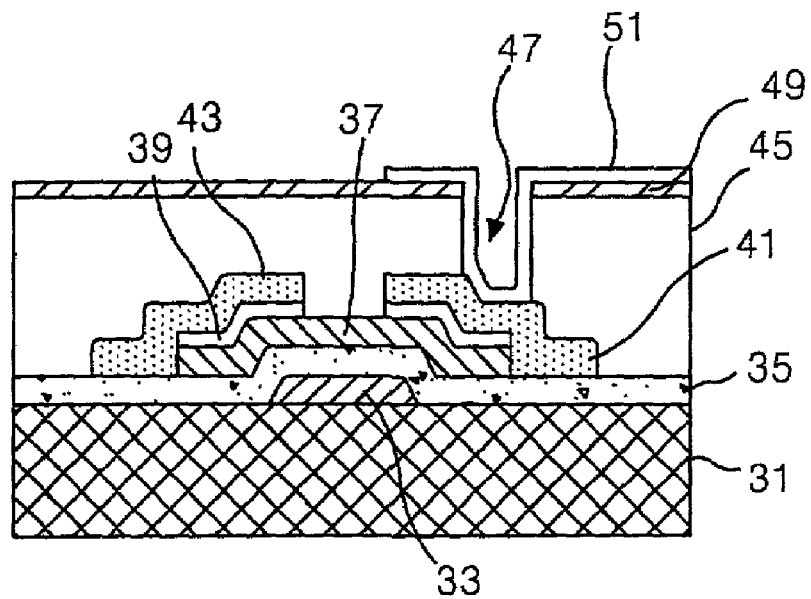

Referring now to FIG. 2E, a transparent conductive material, beneficially an indium tin oxide (ITO), a tin oxide (TO) or an indium zinc oxide (IZO), is then deposited on the buffer layer 49 and into the contact hole 47 such that the transparent conductive material electrically contacts the drain electrode 41. Since the buffer layer 49 has a hydrophilic property, the adhesion between the deposited transparent conductive material and its receiving surface (the exposed surface) is better than it would have been if the buffer layer 49 was not present. The deposited transparent conductive material is then patterned by photolithography using an acid mixture such as $HCl, (COOH)_2$ or $HCl+HNO_3$ as an echant to form a pixel electrode 51. As the adhesion between the buffer layer 49 and the transparent conductive material is relatively strong, the pixel electrode 51 is prevented from being overetched and reduced in size.

According to the principles of the present invention, the surface of a passivation layer having a hydrophobic property is irradiated with UV rays having wavelengths of about 100 to 200 nm at a normal (atmospheric) pressure to form a buffer layer, beneficially of SiO₂ or of another oxide. The buffer layer, beneficially having a thickness of about 10 Å to 50 Å, has a hydrophilic property. Accordingly, a method according to the principles of the present invention has an advantage that, since a buffer layer having a hydrophilic property is formed on the surface of the passivation layer at normal (atmospheric) pressure, the fabrication time is reduced.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. A method of fabricating a liquid crystal display having a thin film transistor with a gate electrode, a gate insulating film, an active layer, an ohmic contact layer, a source electrode, and a drain electrode on a transparent substrate, said method comprising:

forming an organic passivation layer over the transparent substrate and over the thin film transistor;

defining a contact hole through the organic passivation layer to expose the drain electrode;

irradiating the organic passivation layer with ultraviolet rays having a wavelength in a range between about 100 nm and about 200 nm to form a hydrophilic buffer layer having a thickness of 10 Å to 50 Å; and forming a pixel electrode over the hydrophilic buffer layer and in the contact hole such that the pixel electrode contacts the drain electrode via the contact hole and such that the pixel electrode adheres to the hydrophilic buffer layer.

2. The method according to claim 1, wherein the step of forming an organic passivation layer produces an organic passivation layer having a low dielectric constant.

3. The method according to claim 1, wherein the step of irradiating the organic passivation layer occurs at normal processing pressure.

4. The method according to claim 1, wherein the step of irradiating the organic passivation layer occurs at atmospheric pressure.

5. The method according to claim 1, wherein the step of irradiating the organic passivation layer produces a buffer layer comprised of an oxide.

6. The method according to claim 1, wherein the step of forming a pixel electrode produces a transparent pixel electrode.

7. A liquid crystal display, comprising:

a substrate;

a thin film transistor on said substrate, said thin film transistor including a gate electrode, a gate insulating film, an active layer, a source electrode, and a drain electrode;

an organic passivation layer over the thin film transistor;

a hydrophilic buffer layer having a thickness of 10 Å to 50 Å over said passivation layer, the buffer layer formed by irradiating the organic passivation layer with ultraviolet rays having a wavelength in a range between about 100 nm and about 200 nm; and an electrode over said buffer layer.

8. A liquid crystal display according to claim 7, wherein said buffer layer has a hydrophilic property.

9. A liquid crystal display according to claim 8, further including a contact hole through said passivation layer and that exposes said drain electrode, wherein said electrode electrically contacts said drain electrode via the contact hole.

10. A liquid crystal display according to claim 9, wherein said electrode is a pixel electrode.

11. A liquid crystal display according to claim 10, wherein said pixel electrode is transparent.

12. A liquid crystal display according to claim 11, wherein said pixel electrode is comprised of indium.

13. A liquid crystal display according to claim 7, wherein said substrate is transparent.

14. A liquid crystal display according to claim 7, wherein said organic passivation layer is comprised of β-staggered-divinyl-siloxane-benzocyclobutene.

15. A liquid crystal display according to claim 7, wherein said organic passivation layer is comprised of an acrylic organic compound.

16. A liquid crystal display according to claim 7, wherein said organic passivation layer is comprised of perfluorocyclobutane.

17. A liquid crystal display according to claim 7, wherein said buffer layer is an oxide.

18. A liquid crystal display according to claim 7, wherein said organic passivation layer is hydrophobic.

* * * * *